United States Patent [19]

Kleysteuber et al.

[11] 4,025,121

[45] May 24, 1977

[54] HIGH-PRESSURE INJECTION HYDRAULIC TRANSPORT SYSTEM WITH A PERISTALTIC PUMP CONVEYOR

[75] Inventors: William K. Kleysteuber, Wexford; Ernest H. Bean, Pittsburgh, both of Pa.

[73] Assignee: The United States of America as represented by the Secretary of the Interior, Washington, D.C.

[22] Filed: Feb. 26, 1976

[21] Appl. No.: 661,580

[52] U.S. Cl. .................................... 302/14; 302/15
[51] Int. Cl.² ............................................ B65G 53/30
[58] Field of Search .............................. 302/14–16, 302/66; 299/18, 64

[56] References Cited

UNITED STATES PATENTS

| 2,291,912 | 8/1942 | Meyers | 302/14 |
| 3,389,938 | 6/1968 | Frazier | 302/14 |

*Primary Examiner*—Evon C. Blunk
*Assistant Examiner*—Jeffrey V. Nase
*Attorney, Agent, or Firm*—Thomas Zack; Gersten Sadowsky

[57] ABSTRACT

A high-pressure injection hydraulic transport system for conveying solids comprises a pressurizable hopper, a peristaltic pump conveyor, multiple air domes, and means for injecting air into the pumped slurry, such that a "beachcomber" effect is produced in the slurry to maintain the solids in suspension. The peristaltic pumping sequence provides at least two open pumps between a non-adjacent pumping pump and closed pump.

4 Claims, 5 Drawing Figures

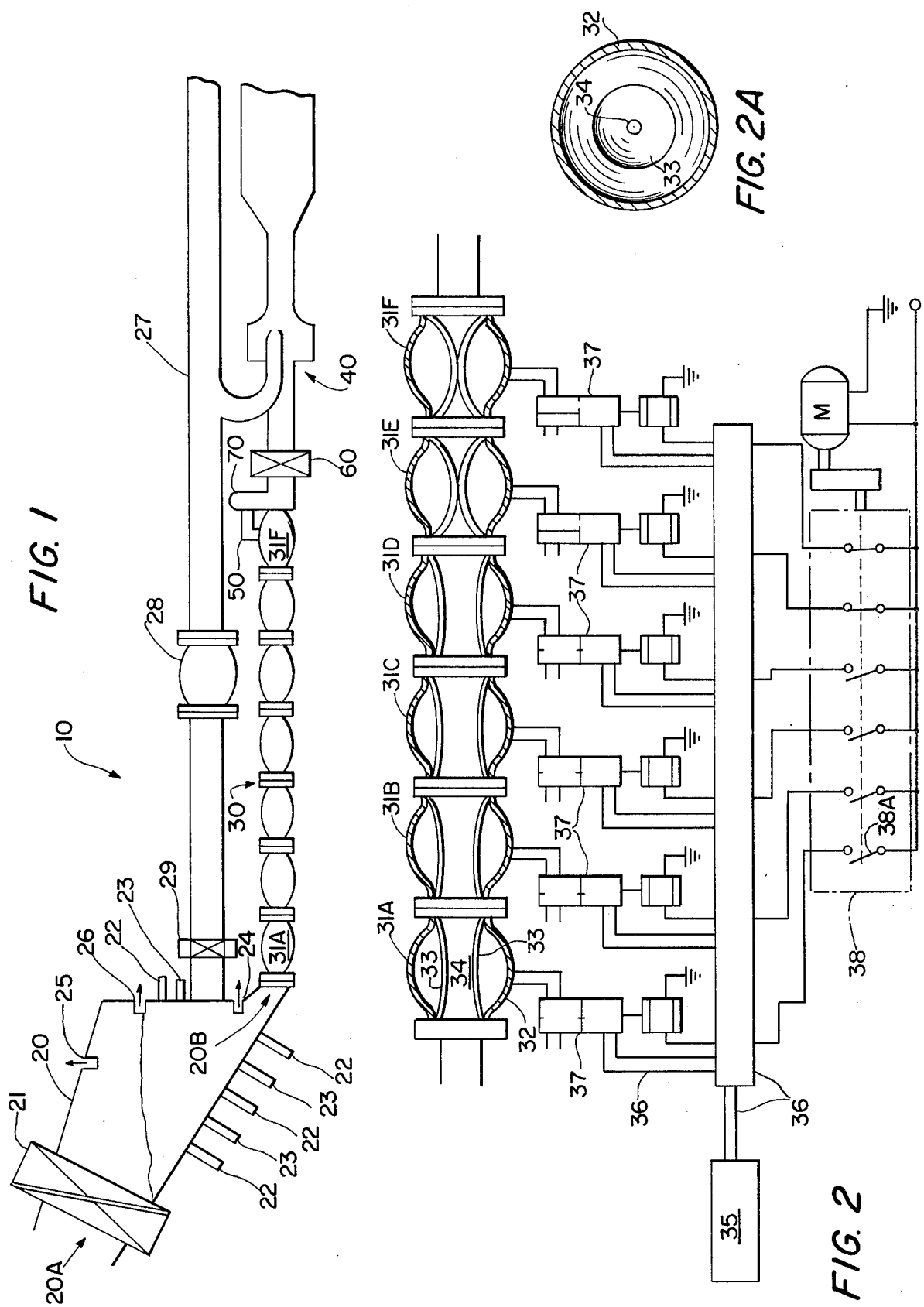

HIGH-PRESSURE INJECTION HYDRAULIC TRANSPORT SYSTEM WITH A PERISTALTIC PUMP CONVEYOR

FIELD OF THE INVENTION

The present invention relates generally to hydraulic transport of solids, and more particularly, to a system for hydraulic transport of mined coal from the mine face utilizing a peristaltic pump conveyor.

DESCRIPTION OF THE PRIOR ART

Increasing energy demands have led to further efforts to increase coal mine productivity and safety, including the haulage of coal from the mine face. The high productivity of current continuous mining techniques requires a transport system which has a high capacity, yet is relatively mobile. In addition, since, in the United States, the sizes of coals seams in the area east of the Mississippi River, where the major markets for coal are located, vary from 2 to 6 feet, with an average around 5 feet, the resulting low head room requires that a low profile transport system be used.

Such conventional systems as conveyor belts, trolleys, shuttle cars, and the like present substantial health and safety problems. Various hydraulic pipeline systems have also been used. Examples of such systems are described in U.S. Pat. No. 2,686,085 (Odell); U.S. Pat. No. 3,602,551 (Velegal); and U.S. Pat. No. 3,617,094 (Kester). However, such systems have disadvantages, in that the size of the solids which may be transported is limited, and there is a tendancy for the pipelines to become plugged from the settling of the solids in the transporting slurry.

Although the use of peristaltic pump apparatus in mines is known (see U.S. Pat. No. 2,291,912 to Meyers), such pumps are relatively inefficient. For example, such apparatus conventionally requires that both a pressure source and a vacuum source be provided in order to positively expand and contract the conduit through which the slurry is conveyed. Further, the conventional peristaltic pumping sequence requires a relatively large number of pump closures per volume of slurry pumped.

Similarly, although systems incorporating gas injection into the slurry being transported in order to prevent settling of the solids are known, (see U.S. Pat. No. 3,575,469) such systems are of limited efficiency.

SUMMARY OF THE INVENTION

The disadvantages of the prior art discussed above, as well as other disadvantages, are overcome by a high-pressure injection hydraulic transport system constructed according to the present invention. The system of the invention comprises a pressure hopper for receiving the solids to be conveyed, means for pressurizing the hopper with a liquid so that the liquid produces a slurry when mixed with the solids, a peristaltic pump conveyor for transporting the slurry, and a jet pump mixer for diluting the slurry pumped by the peristaltic pump conveyor to a predetermined volume concentration of the solids and for further transporting the diluted slurry. The pressure hopper may be provided with means for agitating the solids in said pressurizing hopper prior to pressurization of the hopper, the agitating means in a preferred embodiment comprising fluid jets. In accordance with a further aspect of a transport system constructed according to the invention, gaseous fluid is injected into the slurry pumped by the peristaltic pump conveyor to produce an air bubble in the slurry in timed relation to the pumping action of the conveyor, such that a pressure wave is produced in the slurry being pumped by the peristaltic pump conveyor.

Another aspect of the invention concerns the use of a peristaltic pump conveyor comprising a plurality of peristaltic pumps connected together end to end. Each of the pumps comprises a pressure chamber having disposed therein a pair of spaced, flexible chamber liners, the ends of which are connected to the corresponding ends of the pressure chamber, and the lateral edges of which are connected together such that a pressure-tight, normally open passageway through the pressure chamber is defined by the chamber liners. A peristaltic pumping action is produced by expansion of the chamber liners under pressure, which constricts the passageways, and alternate relaxation of the chamber liners, which returns the passageways to their normally open state, in a predetermined sequence. In a preferred embodiment for a conveyor having at least four pumps, the predetermined sequence is such that a pumping, i.e., activated, pump spaced from a closed pump is separated therefrom by at least two intervening pumps which are capable of receiving a volume of the slurry being pumped. For maximum efficiency, the number of intervening pumps should equal two less than the number of steps in a cycle required to repeat a particular pumping sequence.

Other features and advantages of the invention will be set forth in, or apparent from, the detailed description of a preferred embodiment found hereinbelow.

BRIEF DESCRIPTION OF THE DRAWINGS

FIG. 1 is a diagrammatic representation of a high-pressure injection hydraulic transport system constructed according to the present invention.

FIG. 2(a) is a diagrammatic cross-section of a peristaltic pump conveyor used in an embodiment of the hydraulic transport system constructed according to the present invention.

FIG. 2(b) is a cross-sectional view perpendicular to the longitudinal axis of an embodiment of a pump conveyor constructed according to the present invention having a unitary chamber liner, and showing a pump unit in a partially closed state.

DETAILED DESCRIPTION OF A PREFERRED EMBODIMENT

Figure 3:
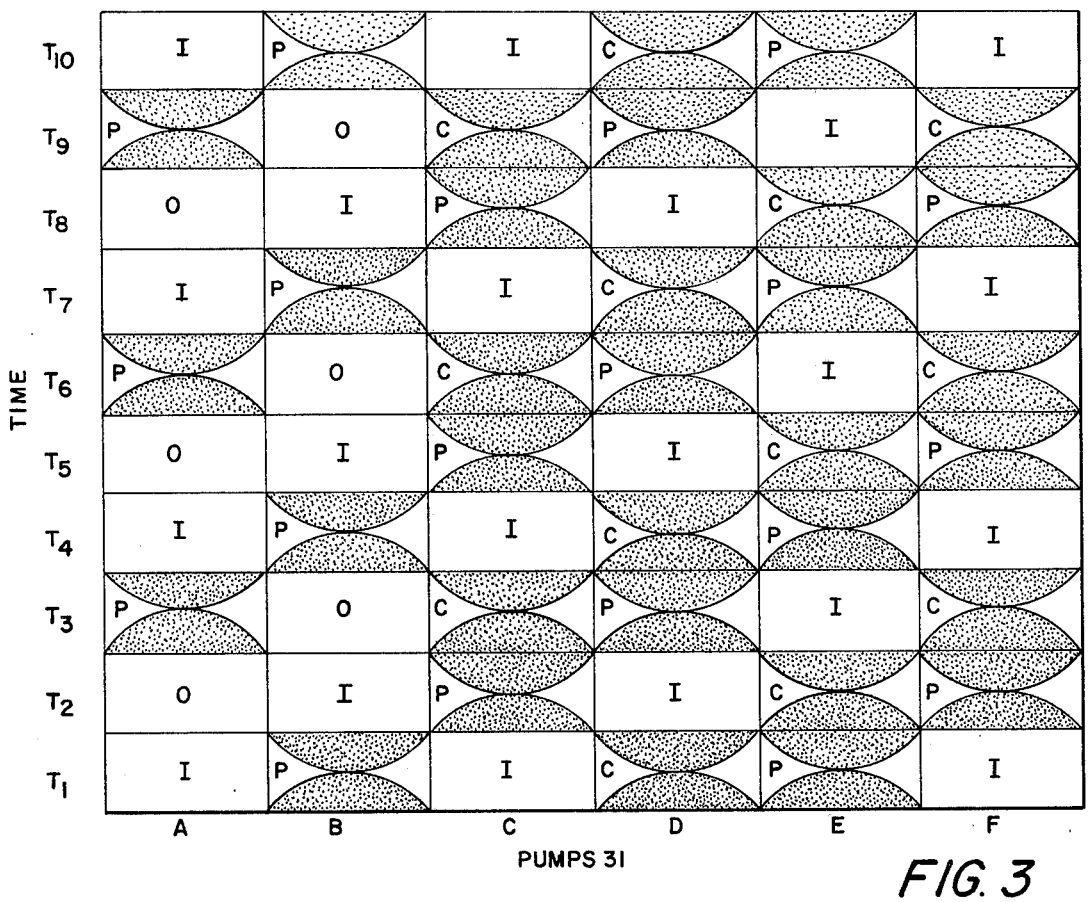
FIG. 3 is a flow diagram illustrating a conventional peristaltic pumping sequence.

Referring to FIG. 1, there is illustrated an embodiment of a hydraulic transport system constructed according to the present invention, with high pressure, controlled flow injection of the solids to be conveyed into the system's pumping unit. The system, generally denoted 10, basically comprises a pressure hopper 20, peristaltic pump conveyor 30, and jet pump mixer 40. The inlet 20A of pressure hopper 20 is provided with a large, automatically controlled gate valve 21 through which the solids to be conveyed, such as coal lumps produced by a mining operation, pass into pressure hopper 20 when valve 21 is open. When gate valve 21 is closed, a pressure tight seal is formed which allows hopper 20 to be pressurized. Pressure hopper 20 is also provided with a plurality of water jets 22 and air jets 23 to wet and agitate the solids in pressure hopper 20, and a series of sensors 24, 25, and 26, which detect and generate control signals representing, respectively, (i) a solids level representing an empty hopper, (ii) a solids level representing a full hopper, and (iii) a predetermined water level. A source of high pressure water (not shown) communicates with hopper 20 through a pipe 27, which includes a throttling pinch valve 28, and a solenoid controlled shut-off valve 29 located therein, as shown.

In order to facilitate description of the system, the structure and operation of peristaltic pump conveyor 30 will be described in more detail hereinbelow. For the purposes of the present description, the input of peristaltic pump conveyor 30 is directly connected to the outlet 20B of pressure hopper 20. Suitable piping 50 is provided to allow waste air from the operation of conveyor 30 to be injected into the slurry output of conveyor 30 through air dome 70, as will be described more fully hereinbelow.

The output of peristaltic pump conveyor 30 enters conventional jet jump mixer 40 through solenoid-controlled valve 60. At least one conventional air dome 70 is provided between conveyor 30 and mixer 40 to prevent "water hammer" and to provide an air cushion, as also will be described more fully hereinafter.

In operation, the solids to be conveyed are allowed to enter pressure hopper 20 after an empty hopper condition has been sensed by sensor 24. For this condition, valves 29 and 60 are closed, and the hopper valve 21 is open, under the control of sensor 24. Water jets 22 wet the solids in the hopper to form a relatively thick slurry and to keep the solids in agitation. Air jets 23 assist in the agitation of the solids, while sensor 26 controls the maximum water level in hopper 20 during filling thereof.

When sensors 25 and 26 detect that the predetermined maximum liquid and solids levels have been reached, hopper valve 21 and the first pump unit 31A of conveyor 30 are closed, and valves 29 and 28 are opened, allowing high pressure water to enter now sealed pressure hopper 20 to rapidly pressurize the hopper. The rate of water flow is controlled by valve 28.

Continuing with the description of the operation of the embodiment of FIG. 1, valve 60 is opened at this point and peristaltic pump conveyor 30 then begins to pump, in a manner to be described hereinbelow, the thick slurry into jet pump mixer 40. The slurry is mixed with additional water in jet pump mixer 40 to dilute the slurry to a volume concentration which will prevent plugging during further transport of the solids.

If it is desired to transport a very thick slurry, or to pump a relatively thin slurry up a grade which would cause settling of the solids into a thick concentration where, for example, the slurry transport stops for some reason, the waste air from the operation of the last pump unit 31F of peristaltic pump conveyor 30 is injected into the slurry output from conveyor 30 through air dome 70, thus causing a "mixing" bubble of air to enter the slurry. The periodic injection of mixing bubbles into the slurry in timed relation to the pulsating action of the peristaltic-type pumping of conveyor 30 results in a beachcomber type of pressure wave which travels through the slurry. The resulting turbulence in the slurry serves to maintain the solids in suspension. A sufficient number of air domes 70 are provided to remove the injected air from the slurry if the slurry is to be subsequently transported through a centrifugal pump. If multiple air domes 70 are provided, the air cushions formed therein allow conveyor 30 to continue its pumping action even when average linear movement of the slurry through conveyor 30 is zero. As a consequence, the pulsating action of conveyor 30 and the beachcomber action produced by the injected air allow the slurry to be kept in suspension within the transport system without settling of the solids in the slurry.

If the hydraulic transport system of the present invention is to be used in a situation where the supply of solids to be conveyed is intermittent, pressure hopper 20 is sized, and minimum solids level sensor 24 is located, so as to provide a residual supply of solids to be conveyed during the period when the supply of solids is interrupted. In addition, if the supply of solids is from a source such as a haulage pipeline, where the solids are in a relatively thin slurry, hopper 20 is modified (not shown) to remove excess water from the hopper during filling thereof.

Referring to FIG. 2(a), the structure of peristaltic pump conveyor 30 will now be described. Conveyor 30 comprises a plurality of individual peristaltic pumps 31A–31F, denoted collectively as 31. Each peristaltic pump 31 comprises a pressure chamber 32 having disposed therein a pair of spaced, flexible chamber liners 33. Chamber liners 33 may advantageously comprise conventional elastomeric material capable of withstanding the stresses and friction associated with this type of pump. The ends of chamber liners 33 are connected to the ends of pressure chamber 32, and the lateral edges of chamber liners 33 are connected directly together such that a pressure tight, normally open passageway 34 through pressure chamber 32 is defined by chamber liners 33. Chamber liners 33 may advantageously be in the form of a unitary liner 33', as shown in the chamber cross-section illustrated in FIG. 2(b). Pumps 31 are connected together such that passageways 34A–F are in relative alignment, thus forming a continuous passageway through conveyor 30.

A source of high pressure air, such as compressor 35, is connected through piping 36 to each of the pressure chambers 32. Pressurization and venting of pressure chambers 32 are controlled by solenoid controlled valves 37. The sequence in which valves 36 are actuated and chambers 32 are thus pressurized or vented is controlled by programmable controller 38, which may comprise cam-operated switches 38A, as shown.

When a pressure chamber 32 is pressurized, chamber liners 33 are caused to expand, thus constricting or pinching the associated passageway 34. When a pressure chamber 32 is vented, the stretched chamber liners 33 will return to their relaxed state, thus returning passageway 34 to its normally open state. With available elastomeric materials, a suction head of 5 psi has been generated by the relaxation of chamber liners 33 just described.

By controlling the sequence in which the various passageways 34A – 34F are constricted and opened, a peristaltic-type pumping action may be induced in conveyor 30 which will transport material therethrough. A conventional peristaltic pumping sequence for conveyor 30 is illustrated in FIG. 3. The status of each pump during each step of a cycle is indicated as follows: A blank box with the letter I represents a pump 31 in which passageway 34 is returning from a contricted or pinched state to the normally open state. This is the equivalent of an intake stroke in which suction is produced. A blank box with the letter O represents an inactive pump 31 in which passageway 34 is in the normally open state. A box with two opposed shaded curves and the letter P represents a pump 31 in which passageway 34 is being constricted or pinched by the action of expanding chamber liners 33. This is the equivalent of a pump stroke in which a positive pressure is produced. A box with two opposed shaded curves together with the letter C represents an inactive pump 31 in which passageway 34 is in the constricted or pinched state. For purposes of illustration, the working cycle is shown beginning at a step when a volume of slurry is entering both pump 31A and 31F. The pumping action should be obvious from the figure. During the first step, indicated at $T_1$, a volume of slurry enters pump A as a result of the intake stroke thereof. The volume of slurry which was in pump B is pumped from pump B to pump C as a result of the pump stroke of pump B and the intake stroke of pump C. Pump D is inactive and passageway 34 therethrough is closed. The volume of slurry which was in pump E is pumped from pump E to pump F as a result of the pump stroke of pump E and the intake stroke of pump F.

During the next step, indicated at $T_2$, the volume which was in pump A progresses to pump B as a result of the intake stroke of pump B. Although a volume of slurry enters the open, inactive pump A, this volume is effectively not pumped, as will become apparent from the description of the next step. The volume of slurry which was in pump C is pumped from pump C to pump D in the same manner as described above for pump B and C. Pump E is now inactive and closed, and the volume of slurry which was in pump F is pumped therefrom out of conveyor 30.

During the third step, pump A closes as a result of its pump stroke. However, since pump C is inactive and closed, and pump B already contains a volume of slurry, the volume of slurry in pump A is partially advanced, if at all, only if the pressure of the slurry to the left of pump A is greater than the volume of slurry in pump B. The net result is to ensure that pump B is completely filled. The volume of slurry which was in pump D is pumped from pump D to pump E, while pump F is in an inactive, closed state.

With the fourth step, the pumping sequence described for the first step is repeated and the cycle just described is repeated over and over, as shown.

It is to be noted that the particular peristaltic sequence shown is not a pure peristaltic sequence, in that the pumping sequence of the first two pumps A and B is different from that for the remaining pumps. The P-C-I, i.e., pumping-inactive closed - intake sequence for each pump C-F, and the basic P-I-C pumping pattern exhibited by pumps C-F for each step of the cycle is the basic conventional pattern for peristaltic pumping, and, in the Meyers type of pump conveyor having six pumping units, would be repeated for all six pumping units. In the example of conventional peristaltic pumping illustrated in FIG. 3, the pumping sequence for pumps A and B has been modified so as to ensure that the initial volume of slurry to be pumped peristaltically completely fills pump B.

As was noted above, and as should be obvious from the preceeding description, it is characteristic of conventional peristaltic pumping sequences that regardless of the number of pumps 31 in conveyor 30, there is never more than one pump capable of receiving a volume of slurry interposed between a pumping pump and a closed pump. Further, for every conveyor 30 with at least three pumps 31, the pumping sequences described above are repeated every fourth step in continuous cycles, regardless of the number of pumps in the conveyor, and only one volume of slurry is pumped out of conveyor 30 during each cycle.

Figure 4:
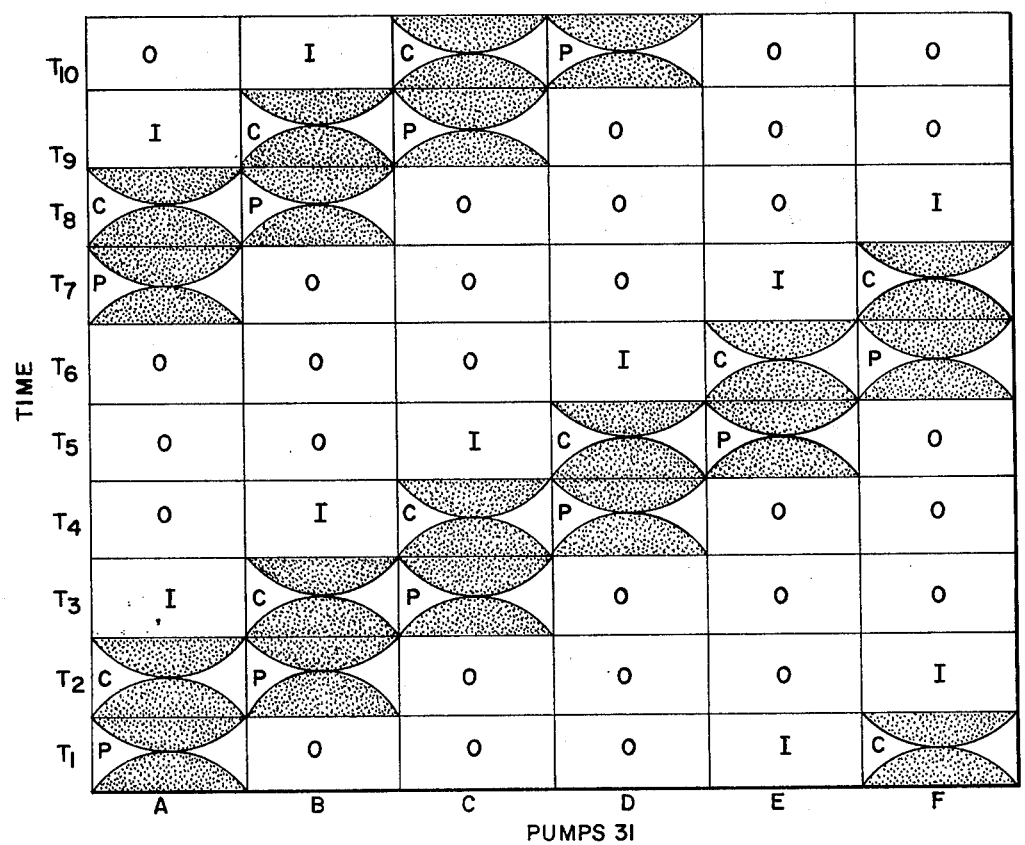
FIG. 4 is a flow diagram illustrating a preferred peristaltic pumping sequence for the conveyor used in the hydraulic transport system constructed according to the present invention.

A preferred peristaltic pumping sequence for conveyor 30 is illustrated in FIG. 4. The same symbols and nomenclature as were used in FIG. 3 are used in FIG. 4. For the purposes of illustration, the working cycle is shown beginning at a step when four volumes of slurry have been pumped into conveyor 30. During the first step, indicated at $T_1$, the pump stroke of pump A forces the volume of slurry which was in pump A into pump B. Pumps B, C, and D are inactive and open, while pump E opens as a result of its intake stroke. Pump F is inactive and closed.

In the next step, indicated at $T_2$, pump A is inactive and closed, while pump B is pumping and Pump F is intaking. Pumps C, D, and E are inactive and open. The net effect is that the volumes of slurry which were in pumps B-E are pumped to the right. Since pump F is now open, volumes of slurry are now free to exit conveyor 30.

In the third step, indicated at $T_3$, pump A intakes, pump B is inactive and remains closed, pump C pumps, and the remaining pumps are inactive and remain open. The net result is that a volume of slurry at least equal to the volume of a single pump is ejected from conveyor 30.

The fourth, fifth, and sixth steps are similar to the third step just described, in that the previously inactive closed pump opens, the prevously pumping pump is inactive and remains closed, the previously inactive open pump immediately adjacent to the right of the previously pumping pump pumps, and the remaining pumps are inactive and remain open.

With the seventh step, the pumping sequence of the first step is repeated and the cycle just described is then repeated.

In contrast to conventional peristaltic pumping sequences, it is characteristic of the preferred peristaltic pumping sequence just described that there is always more than one pump capable of receiving a volume of slurry interposed between a pumping pump and a non-adjacent closed pump, that the number of steps in a cycle is dependent on the number of interposed pumps and is equal to the number of interposed pumps plus two, and that the number of volumes of slurry pumped out of conveyor 30 per cycle is equal to two less than the number of steps in the cycle.

It will be appreciated by those skilled in the art that although the invention has been described relative to an exemplary embodiment thereof, modifications and variations can be effected in these embodiments without departing from the scope and spirit of the invention.

I claim:

1. A high-pressure injection, hydraulic transport system for conveying fluidized solids comprising a pressure hopper for receiving the solids, means for pressurizing said hopper with a liquid pressurizing medium, said liquid pressurizing medium producing a slurry when mixed with the solids, a peristaltic pump conveyor for transporting said slurry, and means for diluting said slurry pumped by said peristaltic pump conveyor to a predetermined volume of concentration of the solids and for further transporting said diluted slurry.

2. The pumping system as claimed in claim 1 and further comprising means for agitating the solids in said pressurizing hopper prior to pressurization of said hopper.

3. The pumping system as claimed in claim 2 wherein said agitating means comprises fluid jets and said diluting and transporting means comprises a jet pump mixer.

4. The pumping system as claimed in claim 1 wherein said peristaltic pump conveyor comprises a plurality of peristaltic pumps connected together end to end, each of said peristaltic pumps comprising a pressure chamber having disposed therein a pair of spaced, flexible chamber liners, means for connecting the ends of said chamber liners with the corresponding ends of said pressure chamber, means for connecting the lateral edges of said chamber liners together such that a pressure-tight, normally open passageway through said pressure chamber is defined by said chamber liners; means for pressurizing and means for venting each of said pressure chambers in a predetermined sequence, such that a peristaltic-type pumping action is produced by the alternate expansion of said chamber liners under pressure to constrict said passageways and relaxation of said chamber liners to return said passageways to their normally open state.

* * * * *